United States Patent [19]

Anderson et al.

[11] Patent Number: 5,398,264
[45] Date of Patent: Mar. 14, 1995

[54] GRID WELDING FIXTURE FOR A SPACER GRID

[75] Inventors: Michael W. Anderson; Jeffrey S. Whitt, both of Lynchburg, Va.

[73] Assignee: B&W Fuel Company, Lynchburg, Va.

[21] Appl. No.: 247,214

[22] Filed: May 20, 1994

[51] Int. Cl.⁶ .............................................. G21C 21/00
[52] U.S. Cl. .................................... 376/260; 219/158; 269/40; 269/41; 269/118; 976/DIG. 81; 29/723
[58] Field of Search ............................... 376/260, 261; 976/DIG. 81; 269/40, 41, 111, 118, 287, 312, 909; 219/158, 161; 29/723, 906

[56] References Cited

U.S. PATENT DOCUMENTS 4,492,844 1/1985 Kobuck et al. ..................... 376/261

Primary Examiner—Daniel D. Wasil
Attorney, Agent, or Firm—Robert J. Edwards; D. Neil LaHaye

[57] ABSTRACT

A modular grid welding fixture for a spacer grid that facilitates full grid laser welding of a spacer grid in one setup. The modular design allows for partial implementation of each weld type. A base plate is used for mounting to the positioning/rotational plate of the welding system. A removable sub-plate received in the base plate is used to position the grid strips for proper location for welding. A top fixture plate is aligned with the base plate and provides for mounting of a second sub-plate if required. Side plates with spring loaded pressure pads that are hinged to the top fixture plate apply uniform pressure to the outer grid strips during processing. The base plate, top plate, side plate, and pressure pads are provided with a plurality of through holes to allow access of the laser beam for welding. Corner clips are used to insure contact of the overlapping sections of the outer grid strips for proper corner welding.

11 Claims, 2 Drawing Sheets

GRID WELDING FIXTURE FOR A SPACER GRID

BACKGROUND OF THE INVENTION

1. Field of the Invention

The invention is generally related to nuclear fuel assemblies and particularly to the fabrication of spacer grids used in nuclear fuel assemblies.

2. General Background

Fuel assemblies for nuclear reactors are formed from a number of fuel rods held in position radially by spacer grids located along the length of the fuel rods. The spacer grids are formed from slotted metal strips containing stamped features, which are crisscrossed on edge to define individual cells for each fuel rod. The crossing metal strips are aligned at approximate right angles to each other and then welded together at the intersections of the strips. A clamping fixture is used to hold the strips in position after they are properly aligned. The clamping fixture is then held by a welding fixture that is attached to the welding system. The welding system includes a laser, a vacuum weld chamber, and a mechanism that positions, rotates, and inverts the weld fixture as necessary to accommodate the intersection welding on both sides of the spacer grid. Typically, the inner strips of the spacer grid are meshed with each other to form the egg crate, aligned, and the intersection welds are made on the inner strips. The welded inner strips are removed from the weld system and weld fixture and the outer grid strips are positioned onto the welded inner strips and held in place by deformation of the inner edge weld tabs. The grid, with the outer strips attached, is placed into the edge weld system that includes a weld chamber, an indexing fixture for positioning the grid, and weld heads. The edge welding system does not weld the corners of the grid. The corners are manually welded, which requires a high level of operator attention and intervention. As a result, weld quality is variable and the edge welding process requires as much as one hour per spacer grid. The present use of different mechanical setups leaves a need for a more efficient means of welding spacer grids.

SUMMARY OF THE INVENTION

The present invention addresses the above need in a straightforward manner. What is provided is a modular grid welding fixture for a spacer grid that facilitates full grid laser welding of a spacer grid in one setup. The modular design allows for partial implementation of each weld type. A base plate is used for mounting to the positioning/rotational plate of the welding system. A removable bottom sub-plate received in the base plate is used to position the grid strips for proper location for welding. A top fixture plate is aligned with the base plate and provides for mounting of a top sub-plate. Side plates with spring loaded pressure pads that are hinged to the top fixture plate are used to apply uniform pressure to the outer grid strips during processing. The base plate, top plate, side plate, and pressure pads are provided with a plurality of through holes to allow access of the laser beam for welding. Corner clips are used to insure contact of the overlapping sections of the outer grid strips for proper corner welding. The option of using different sub-plates allows for edge and/or corner welding without intersection welding or full grid welding with the change of only the sub-plates as opposed to changing the entire fixture.

BRIEF DESCRIPTION OF THE DRAWINGS

For further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
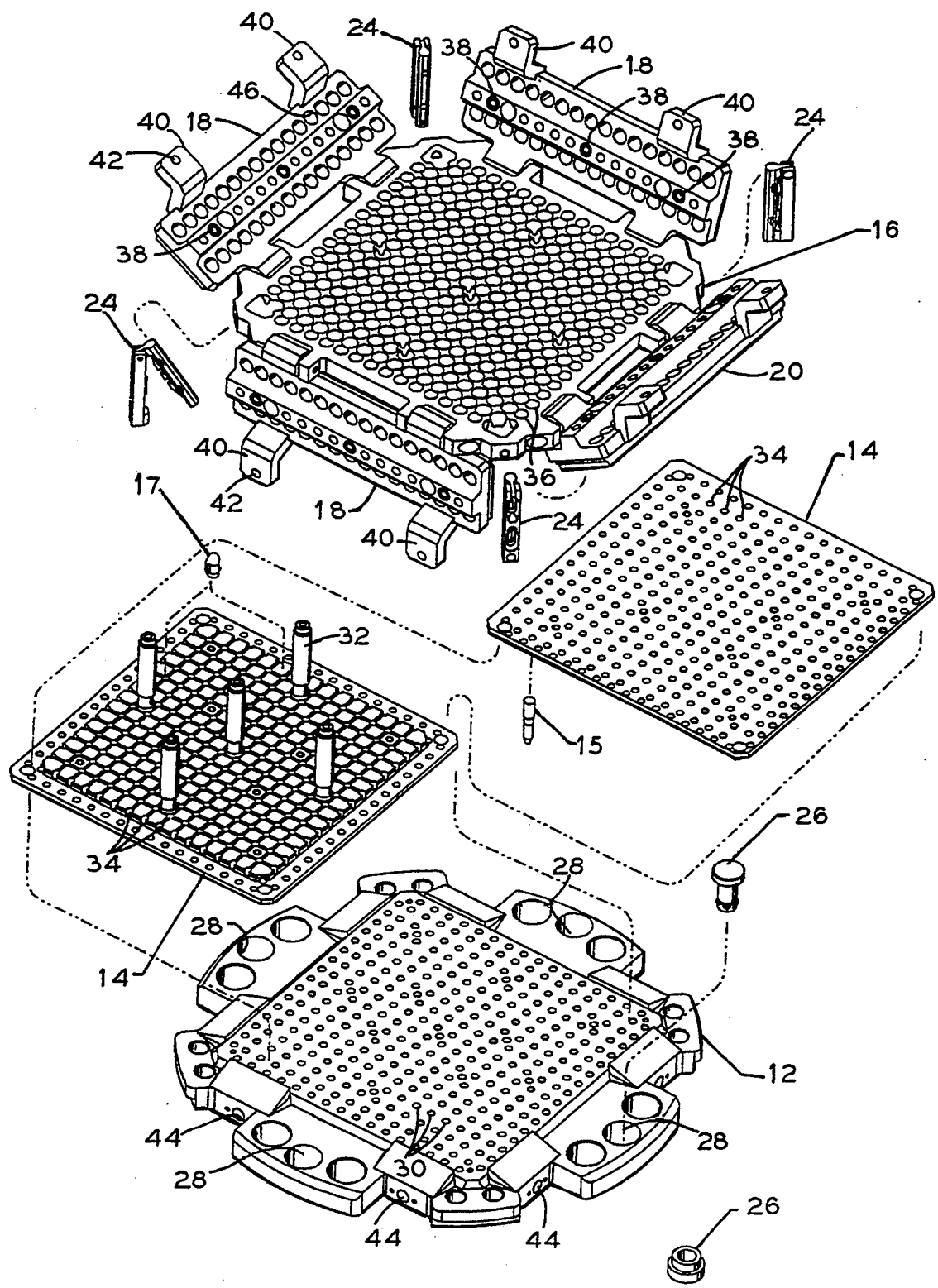
FIG. 1 is an exploded view of the invention.

Referring to the drawings, it is seen in FIG. 1 that the invention is generally indicated by the numeral 10. Grid welding fixture 10 is generally comprised of base plate 12, sub plates 14, top fixture plate 16, side plates 18, pressure pads 20, and corner clip 24.

Base plate 12 is mounted to the positioner of the grid welding system (not shown) by means of two three-point ball lock retainers 26 that are received through bores 28 in base plate 12. Base plate 12 is provided with a plurality of conical through holes 30 that provide laser beam access for intersection welding of the strips of the spacer grid. Holes 30 correspond to the holes in sub-plate 14 that are positioned substantially at the intersection of the grid strips. Base plate 12 provides for fastening of side plates 18 thereto and for removable mounting of a sub-plate 14 thereto.

Although a sub-plate 14 that uses guide pins 32 along with alignment pin 15 and alignment pin 17 is illustrated, it should be understood that this is merely illustrative and that the design of the invention and base plate 12 is such that any of several sub-plate designs may be used. Depending on the design of sub-plate used, a lower sub-plate may be used alone or in combination with an upper sub-plate 14 as illustrated in FIG. 1. The sub-plates are provided with a plurality of holes 34 that are substantially at the intersections of the grid strips to provide laser beam access for intersection welding. The sub-plates act to restrain and position the grid strips for proper welding.

Top fixture plate 16 is designed for removable mounting or attachment of a sub-plate 14 as required. Top fixture plate 16, like base plate 12, is provided with a plurality of conical through holes 36 that provide laser beam access for intersection welding of the strips of the spacer grid. Top fixture plate 16 acts as a carrier plate for side plates 18 and pressure pads 20 through a hinged connection of one side plate 18 to each side of top fixture plate 16.

Side plates 18 are hingedly attached to top fixture plate 16 to allow pivoting of side plates 18 between a first up position where pressure pads 20 are out of contact with the spacer grid strips and a second down position where pressure pads 20 are in contact with the outer strips of the spacer grid. In the first up position, there is room for access to the grid strips for installation of the outer grid strips and installation of part of the corner weld tooling.

Pressure pads 20 are spring loaded in side plates 18 in order to apply uniform pressure to the outer grid strips during processing. The application of uniform pressure is necessary to accommodate shrinkage of the grid during the welding process. Adjusting screws 38, provided on each side plate 18, are attached between side plate 18 and pressure pad 20 to allow retraction of each pressure pad 20(drawing the pressure pad toward the side plate). This assures that there is no pressure against the outer grid strips when the side plates are moved into the second down position. Means for holding side plates 18 in the second closed position is provided in the form of flanges 40 provided on each side plate 18. Flanges 40 are each provided with a bore 42 therethrough that is in coaxial alignment with a corresponding bore 44 in base plate 12. Any suitable fastening means may be used such as bores 44 being threaded for receiving a threaded fastener. Side plates 18 and pressure pads 20 are provided with a plurality of through holes 46 to allow access of the laser beam for welding.

Figure 2:
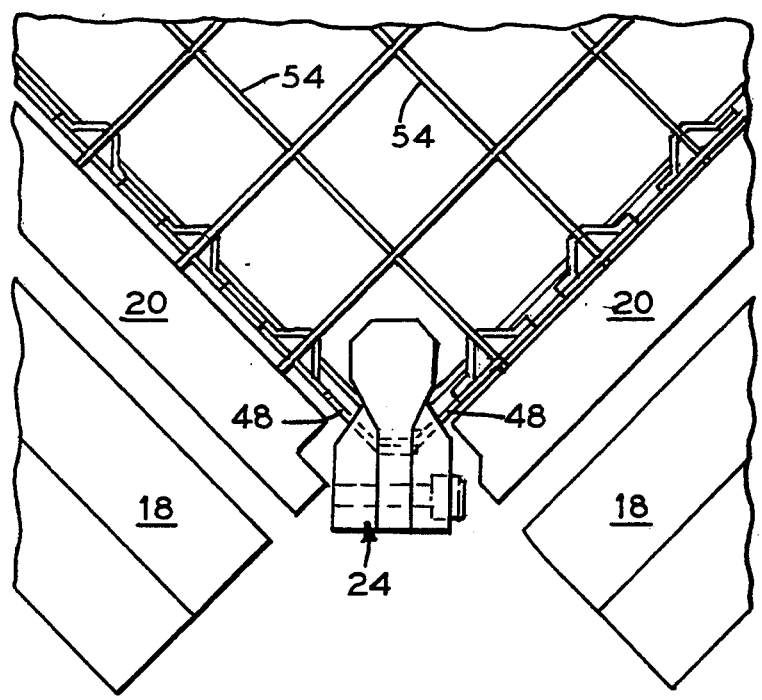
FIG. 2 is a sectional top view of the invention illustrating the action of the corner clip.
Figure 3:
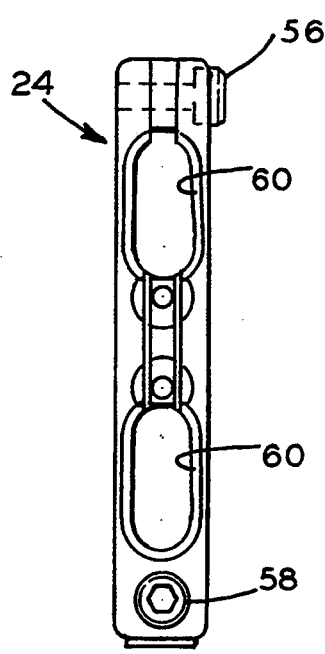
FIG. 3 is an end view of a corner clip.
Figure 4:
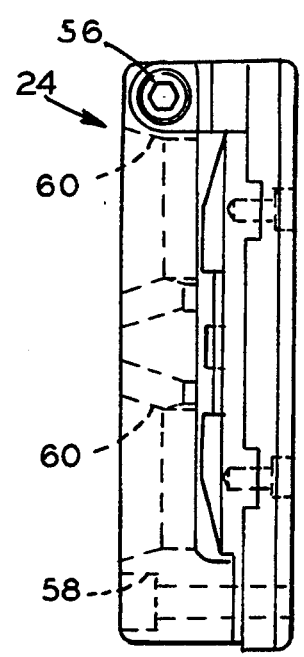
FIG. 4 is a view of a corner clip rotated ninety degrees from that in FIG. 3.

To achieve corner welding on the grids, the corners must also be fixtured. As seen in FIG. 2, outer grid strips 48 have overlapping sections at the corner of the grid. The overlapping sections are bent in advance to achieve the necessary overlap. Contact of the overlapping sections is necessary to achieve proper corner welds. This is accomplished by the use of a corner clip 24. As seen in FIG. 1, 3, and 4 corner clips 24 are formed from two parts that are pivotally attached to each other at one end by screw 56 so that the two parts may be opened and closed in a scissoring action relative to each other. Corner clips 24 as seen in FIG. 1-2 are installed through the outer cell of the grid in all four corners. The corner clip is such that when scissored open, installed into a corner cell, and scissored closed and clamped via a screw 58, the overlapping corner sections of the outer grid strips 48 are held in contact for welding. Bores 60 provide laser beam access for the welding of the overlapping sections of the outer grid strips.

In operation, a sub-plate is mounted on or attached to base plate 12 and a second sub-plate, if needed is mounted to top fixture plate 16. Inner grid strips 54 are assembled to form the egg crate and positioned on the sub-plate mounted on base plate 12. Guide pins are used by the type of sub-plate in use. Adjusting screws 38 are used to retract pressure pads 20 toward side plates 18. Top fixture plate 16 is positioned over the egg crate and attached to guide pins 32 via screws. Side plates 18 are raised to allow installments of outer grid strips 48. Side plates 18 are rotated from the first up position to the second down position and flanges 40 are attached to base 12. Adjusting screws 38 are used to allow pressure pads 20 to bear against the grid assembly. Corner clips 24 are now installed in the four corners. The entire weld fixture 10 is received on and attached to the weld system positioning plate by use of the ball lock retainers 26 and bores 28. The welding of the entire grid is now achieved. The completed grid is removed and the process is repeated for the next spacer grid. Grid welding fixture 10 thus provides for inner and outer grid strip welding and corner welding with one equipment setup.

Because many varying and differing embodiments may be made within the scope of the inventive concept herein taught and because many modifications may be in the embodiment herein detailed in accordance with the descriptive requirement of the law, it is to be understood that the details herein are to be interpreted as illustrative and not in a limiting sense.

What is claimed as invention is:

1. A grid welding fixture for a spacer grid, comprising:
   a. a base plate having a plurality of through holes that correspond to the intersections of strips in the spacer grid to be welded;
   b. a sub-plate adapted to be received on said base plate, said sub-plate being designed to provide positional location of the grid strips of the spacer grid for welding;
   c. a top fixture plate having a plurality of through holes that correspond to the intersections of strips in the spacer grid to be welded, said top fixture plate being designed to be received above said base plate on the spacer grid to be welded;
   d. a side plate hingedly attached to each side of said top fixture plate so as to be movable between a first up position and a second down position; and
   e. a pressure pad mounted on each of said side plates such that said pressure pads contact the spacer grid to be welded when said side plates are in said second position.

2. The grid welding fixture of claim 1, wherein said pressure pads are spring loaded in said side plates.

3. The grid welding fixture of claim 1, wherein said side plates are adapted to be attached to said base plate when said side plates are in said second position.

4. The grid welding fixture of claim 1, further comprising a second sub-plate received on said top fixture plate, said second sub-plate being designed to cooperate with said sub-plate on said base plate to provide positional location of the grid strips of the spacer grid for welding.

5. The grid welding fixture of claim 1, further comprising a corner clip designed to fixture the corners of the outer grid strips of the spacer grid to be welded.

6. A grid welding fixture for a spacer grid, comprising:
   a. a base plate having a plurality of through holes that correspond to the intersections of strips in the spacer grid to be welded;
   b. a sub-plate adapted to be received on said base plate, said sub-plate being designed to provide positional location of the grid strips of the spacer grid for welding;
   c. a top fixture plate having a plurality of through holes that correspond to the intersections of strips in the spacer grid to be welded, said top fixture plate being designed to be received above said base plate on the spacer grid to be welded;
   d. a side plate hingedly attached to each side of said top fixture plate so as to be movable between a first up position and a second down position and adapted to be attached to said base plate when in said second position; and
   e. a pressure pad mounted in a spring loaded fashion on each of said side plates such that said pressure pads contact the spacer grid to be welded when said side plates are in said second position.

7. The grid welding fixture of claim 6, further comprising a second sub-plate received on said top fixture plate, said second sub-plate being designed to cooperate with said sub-plate on said base plate to provide positional location of the grid strips of the spacer grid for welding.

8. The grid welding fixture of claim 6, further comprising a corner clip designed to fixture the corners of the outer grid strips of the spacer grid to be welded.

9. A grid welding fixture for a spacer grid, comprising:

a. a base plate having a plurality of through holes that correspond to the intersections of strips in the spacer grid to be welded;

b. a sub-plate having a plurality of through holes and adapted to be received on said base plate, said sub-plate being designed to provide positional location of the grid strips of the spacer grid for welding;

c. a top fixture plate having a plurality of through holes that correspond to the intersections of strips in the spacer grid to be welded, said top fixture plate being designed to be received above said base plate on the spacer grid to be welded;

d. a side plate hingedly attached to each side of said top fixture plate so as to be movable between a first up position and a second down position and adapted to be attached to said base plate when in said second position, each of said side plates having a plurality of through holes; and e. a pressure pad mounted in a spring loaded fashion on each of said side plates such that said pressure pads contact the spacer grid to be welded when said side plates are in said second position, each of said pressure pads having a plurality of through holes.

10. The grid welding fixture of claim 9, further comprising a corner clip designed to fixture the corners of the outer grid strips of the spacer grid to be welded.

11. The grid welding fixture of claim 9, further comprising a second sub-plate received on said top fixture plate, said second sub-plate being designed to cooperate with said sub-plate on said base plate to provide positional location of the grid strips of the spacer grid for welding.

* * * * *